US008736105B2

(12) United States Patent
Haaf et al.

(10) Patent No.: US 8,736,105 B2
(45) Date of Patent: May 27, 2014

(54) PRINTING PRESS WITHOUT PAPER DURING POWER FAILURE AND METHOD OF OPERATING THE PRINTING PRESS

(75) Inventors: Franz Haaf, Sinsheim-Weiler (DE); Kamilla Haaf, legal representative, Sinsheim-Weiler (DE); Klaus-Dieter Kleibaumhüter, Bad Schönborn (DE); Helmut Meyer, Wiesloch (DE); Werner Stadler, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 528 days.

(21) Appl. No.: 12/881,477

(22) Filed: Sep. 14, 2010

(65) Prior Publication Data

US 2011/0107931 A1 May 12, 2011

(30) Foreign Application Priority Data

Sep. 14, 2009 (DE) ........................ 10 2009 041 485

(51) Int. Cl.

*H02J 3/14* (2006.01)
*D06C 15/08* (2006.01)
*B41L 1/02* (2006.01)
*B41L 3/02* (2006.01)
*B41F 13/24* (2006.01)

(52) U.S. Cl.

USPC ........... 307/31; 100/155 R; 101/484; 101/232

(58) Field of Classification Search

None

See application file for complete search history.

(56) References Cited

U.S. PATENT DOCUMENTS 3,195,456 A * 7/1965 Charlwood et al. ........... 101/184
5,182,803 A 1/1993 Rodi et al.
5,720,222 A 2/1998 Reichardt et al.
5,735,213 A * 4/1998 Bury ............................ 101/480
6,615,730 B2 9/2003 Tokiwa
6,624,620 B2 9/2003 Hammer et al.
7,287,473 B2 10/2007 Kleibaumhüter et al.
7,334,790 B2 2/2008 Foerch et al.
7,406,916 B2 8/2008 Panteleos et al.
8,026,681 B2 9/2011 Alexander et al.

(Continued)

FOREIGN PATENT DOCUMENTS

CN 1058111 A 1/1992
CN 1699066 A 11/2005

(Continued)

OTHER PUBLICATIONS

German Patent and Trademark Office Search Report, Dated May 5, 2010.

*Primary Examiner* — Fritz M Fleming
*Assistant Examiner* — Aqeel Bukhari
(74) *Attorney, Agent, or Firm* — Laurence A. Greenberg; Werner H. Stemer; Ralph E. Locher

(57) ABSTRACT

An electrical voltage supply device for machines processing printing material includes at least one drive motor for the transport of printing material and at least one further electrical consumer. A control unit is provided which, when the supply voltage drops below a minimum acceptable supply voltage of the machine processing printing material, switches of electrical consumers which are not required for the transport of printing material and supplies the drive motor for the transport of printing material from energy stored in the moving masses of the machine processing printing material.

19 Claims, 1 Drawing Sheet

(56) References Cited

U.S. PATENT DOCUMENTS

| | | | | |
|---|---|---|---|---|
| 2002/0144609 | A1 * | 10/2002 | Tokiwa | 100/155 R |
| 2002/0189480 | A1 * | 12/2002 | Ohno et al. | 101/484 |
| 2004/0086083 | A1 * | 5/2004 | Bier et al. | 378/196 |
| 2006/0185551 | A1 | 8/2006 | Mehlis et al. | |
| 2007/0085872 | A1 * | 4/2007 | Teradaira | 347/19 |
| 2010/0001134 | A1 | 1/2010 | Braeutigam et al. | |

FOREIGN PATENT DOCUMENTS

| | | | |
|---|---|---|---|
| CN | 2737552 | Y | 11/2005 |
| CN | 1824502 | A | 8/2006 |
| DE | 10 2004 022 234 | A1 | 12/2005 |
| DE | 202005020612 | U1 | 5/2006 |
| DE | 10 2006 055 302 | A1 | 6/2007 |
| DE | 10 2006 055 545 | A1 | 5/2008 |
| DE | 10 2008 009 907 | A1 | 9/2008 |
| DE | 10 2007 028 098 | A1 | 12/2008 |
| EP | 1 223 656 | A1 | 7/2002 |
| EP | 2099113 | A1 | 9/2009 |
| JP | H0929942 | A | 2/1997 |
| JP | 2002307663 | A | 10/2002 |
| JP | 2005131878 | A | 5/2005 |
| JP | 2009514702 | A | 4/2009 |
| WO | 2009010246 | A2 | 1/2009 |

* cited by examiner

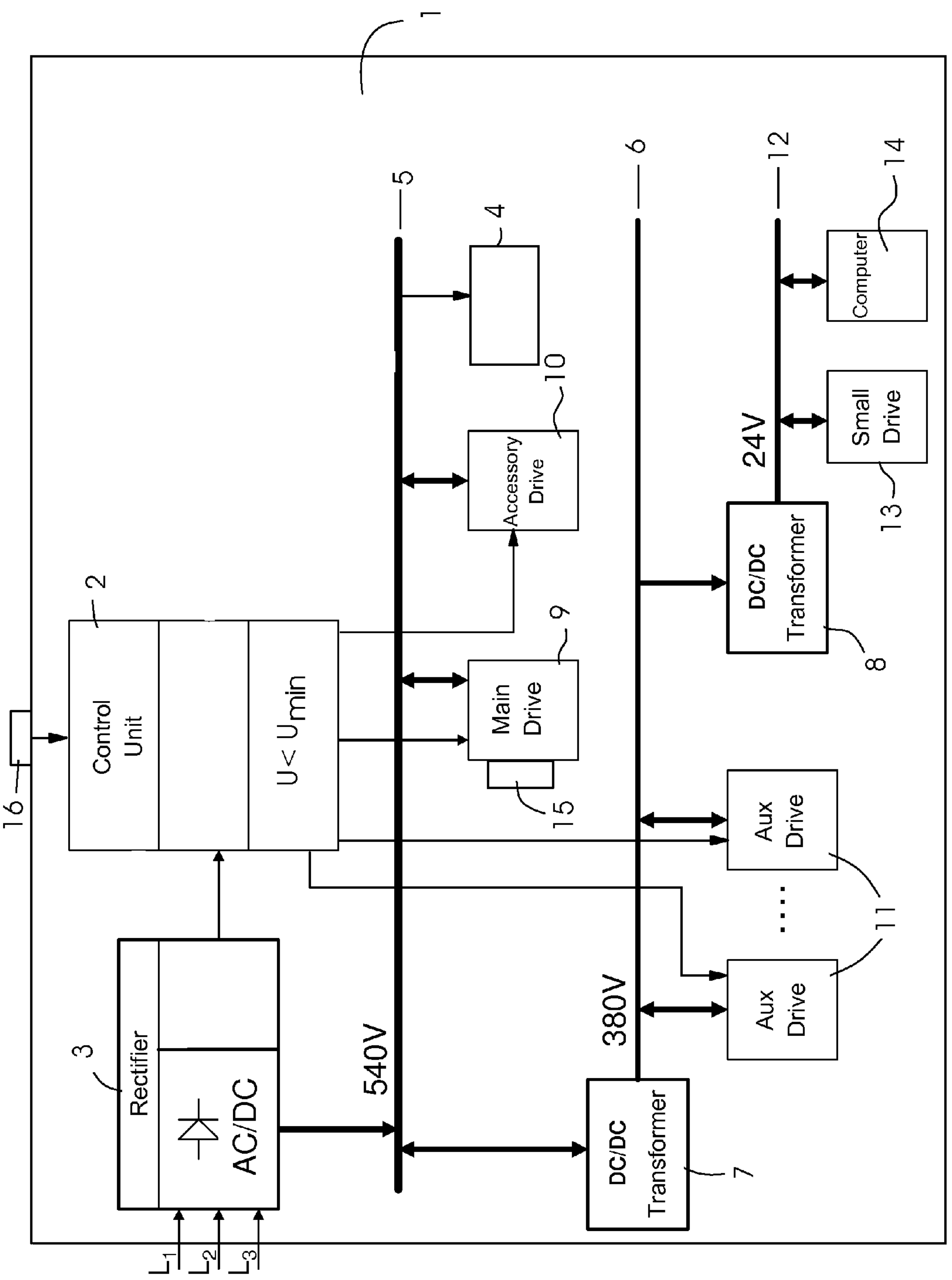
1
Control Unit
2
U< Umin
16
Rectifier
3
AC/DC
540V
5
4
Accessory Drive
10
Main Drive
9
15
6
380V
DC/DC Transformer
7
Aux Drive
Aux Drive
11
DC/DC Transformer
8
12
24V
Small Drive
13
Computer
14
L1
L2
L3

PRINTING PRESS WITHOUT PAPER DURING POWER FAILURE AND METHOD OF OPERATING THE PRINTING PRESS

CROSS-REFERENCE TO RELATED APPLICATION

This application claims the priority, under 35 U.S.C. §119, of German application DE 10 2009 041 485.1, filed Sep. 14, 2009; the prior application is herewith incorporated by reference in its entirety.

BACKGROUND OF THE INVENTION

Field of the Invention

The present invention relates to an electrical voltage supply device for machines processing printing material including at least one drive motor for the transport of printing material and at least one further electrical consumer.

When a power failure occurs during the operation of a machine processing printing material, the result is not only a short interruption of the operation but a longer standstill because such a power outage also shuts down the control unit of the printing press, thus requiring a time-consuming reboot of the control unit. Moreover, after the outage, the printing press must be re-accelerated to printing speed. Voltage supply devices which are equipped to provide an emergency power supply during power outages are known from the prior art. Such a power supply is known from published, European patent application EP 1 223 656 A1, corresponding to U.S. Pat. No. 6,624,620, which discloses to connect a rotary printing press to an interruption-free power supply. This interruption-free power supply includes a supplying energy storage unit which, in accordance with one embodiment, allows the printing operation to be continued. For this purpose, a sufficiently large energy storage unit is provided and, if required, is operated in the form of a diesel engine. In a solution using a smaller energy storage unit, a defined shut-down of the press is ensured when a complete mains failure occurs.

A similar device for emergency power supply is disclosed in published, German patent application DE 10 2004 022 234 A1. Here, a printing press has a number of direct current voltage levels which are connected in parallel via what is known as a direct current voltage supply bus. Components for supplying power in the case of voltage dips or mains failures are also coupled to the direct current voltage supply bus. These components may be capacitors, accumulators, fuel cells, flywheel energy storage devices, or generators with combustion engines.

Published, German patent application DE 10 2008 009 907 A1 discloses an electrical voltage supply device for machinery processing printing materials. Upon a power outage or voltage dip, the voltage supply device allows the machine to be brought to a secure operating state. When a power outage or voltage dip occurs, the kinetic energy stored in the drive motor of the machine processing printing material is used to supply power to those electrical consumers which are essential to control the machine. If the kinetic energy in the drive motor of the machine processing printing material drops below a minimum value, the electrical energy to supply the control components of the machine is provided by an energy storage device such as an accumulator or capacitor.

SUMMARY OF THE INVENTION

It is accordingly an object of the invention to provide a printing press without paper during a power failure and a method of operating the printing press which overcome the above-mentioned disadvantages of the prior art methods and devices of this general type, which has an electrical voltage supply device for machines processing printing material, the device ensuring controlled operation of the machine as well as allowing a quick resumption of operation when a power outage or voltage dip occurs.

With the foregoing and other objects in view there is provided, in accordance with the invention an electrical voltage supply device for a machine processing printing material. The machine has at least one drive motor for transporting the printing material and further electrical consumers. The electrical voltage supply device has a control unit which, when a supply voltage drops below a minimum acceptable supply voltage of the machine processing the printing material, switches off the further electrical consumers which are not required for the transport of the printing material and supplies the drive motor for the transport of the printing material from energy stored in moving masses of the machine processing the printing material.

The electrical voltage supply device of the invention for machines processing printing material has a control unit which, on the one hand, monitors the voltage supply of the machine and on the other hand coordinates the power consumers of the machine. For this purpose, the control unit is equipped with a voltage sensor which continuously monitors the mains voltage supply to detect voltage dips or power outages. Furthermore, the control unit is connected at least to the main drive motor and further drive motors as well as to power consumers in the machine processing printing material via a communication system such as a bus system. In this manner, the control unit may cut off individual drive motors or other power consumers from the voltage supply of the machine and may thus rigorously reduce energy consumption of the machine when voltage dips or power outages occur.

Electrical voltage supply devices of the prior art are mainly used to compensate short power failures or to bring the machine to a safe state and shut it down in the case of long-term power outages. The present invention, however, goes one significant step further. A problem of long sheet-fed rotary printing presses or web-fed lithographic offset printing presses is that the press is shut down and printing material stays in the press. Printing material that stayed in the press when it is shut down, however, needs to be removed before the press can print again because otherwise the press may be damaged when it is restarted. So far presses have been emptied after power outages by use of a handwheel. However, in particular for large and long sheet-fed printing presses, this is a time-consuming process which is exhausting for the operator.

In accordance with the invention, when the voltage supply drops below a minimum acceptable voltage, the control unit assumes a substantial voltage dip or an imminent power outage. In this case, the control unit switches off those electrical consumers of the machine processing printing material that are not required for transporting printing material. The kinetic energy which is stored in these consumers such as auxiliary motors may then be used to supply power to the drive motor driving the transport of printing material so that the transport of printing material may continue and the printing material may be conveyed out of the press. Thus it is ensured that when the machine processing the printing material is restarted after the end of the power outage, no more printing material is present in the machine and an immediate restart of the machine is possible. Moreover, by use of the kinetic energy stored in the electrical consumers of the machine processing the printing material, it is possible to continue the printing operation at least for a short period after the power outage in order for the printing material remaining in the machine to be correctly printed to avoid unnecessary waste.

In accordance with an advantageous feature of the invention, when the voltage supply drops below a minimum acceptable voltage, the control unit stops the feeding of printing material to the machine processing printing material. If the machine is a sheet-fed rotary printing press, all that is necessary for this purpose is to switch off the feeder upstream of the first printing unit so that no more printing material is fed to the press. The sheets that are already present in the press are then completed and deposited in the delivery. In this manner, unnecessary waste of paper and thus of money is effectively avoided. At the same time, this measure ensures that when the press is restarted after the power outage, there is no printing material left in the press and thus an immediate restart is possible.

In accordance with a further feature of the invention the control unit stops the machine after the printing material present in the machine has been conveyed out of the machine. This measure of stopping the machine once the printing material has been conveyed out of the machine is sufficient to meet the safety requirements which stipulate that the machine must not get into an uncontrollable state when there is a power outage. This is avoided by stopping the machine after conveying the printing material out so that the safety requirements are met. At the same time, when the machine is at a standstill, the main printing material transport drive, which is the main power consumer, is switched off, so that the kinetic energy stored in further consumers in the system may primarily be used to supply energy to the electrical control units, thus avoiding the necessity of shutting down the control unit such as the control computer of the machine processing printing material.

In accordance with yet a further advantageous feature of the invention, the control device records the duration of a voltage dip and, if the voltage dip is only of a short duration, continues the processing of printing material in the machine. In the case of very short voltage dips, an interruption of the printing process is thus avoided, and the printing speed of the press is reduced only temporarily without requiring a standstill of the machine and a previous conveying out of the printing material located in the machine. This results in considerable increase in the availability of the press and avoids unnecessary periods of standstill. Only when a maximum acceptable duration of a voltage dip has been exceeded and thus the kinetic energy stored in the machine is no longer sufficient for continued operation of the machine processing printing material is the machine switched into emergency operation and is the printing material present in the machine conveyed out of the machine and is the machine subsequently stopped. The stopping of the press once the printing material has been conveyed out may be done by switching on a braking resistor. Such a braking resistor may also be referred to as a chopper. It converts the kinetic energy stored in the drive motors of the machine processing printing material into thermal energy. In contrast to a mechanical brake, braking by resistor is free of wear. This aspect is important in particular for large printing presses with large movable masses because a mechanical brake would be worn down completely by a single braking operation. Yet in addition, a mechanical retaining brake may be provided to act on the printing material transport drive motor. Such a retaining brake is not provided for the actual braking operation. Instead, it is primarily used to prevent the movable masses in the press from turning unintentionally after the machine has been stopped. This means that the retaining brake merely functions as a safety catch.

In accordance with a further feature of the invention, the machine processing printing material includes an operating element for an emergency stop and when this operating element is activated, the control unit causes an immediate stopping of the machine by actuating the braking device and/or the braking resistor. This emergency stop operating element is operative at any time so that even in a phase following a power outage or voltage dip an emergency stop can be performed at any time. This means that even while the printing material that remained in the machine processing printing material is being conveyed out, an emergency stop can be carried out at any time, for example when an operator's extremities get into a dangerous area of the machine. In such a case, the process of conveying out the printing material is aborted and the machine is brought to an immediate standstill by the braking resistor or the braking device or both in combination.

In accordance with yet a further feature of the invention, the machine is a printing press and while the printing material is conveyed out of the machine the control unit maintains the settings in the machine that are required for the printing operation. In particular, the printing position of the impression cylinder, the blanket cylinder and the plate cylinder is maintained, which means that the printing material that remained in the press after the supply of printing material has been stopped is not merely conveyed out of the press but continues to be printed. This prevents the printing material that remained in the press and is conveyed out of it from becoming waste paper that has to be discarded. Thus while the printing material that remained in the press is being conveyed out of the press, the press remains in the printing mode. Due to the large movable masses that are present in printing presses, the kinetic energy stored in these masses is sufficient to print the remaining printing material at an acceptable quality and to avoid waste in the case of a power outage.

Advantageously, the electrical voltage supply device may be provided with at least two different voltage supply levels, and at least two of these different voltage supply levels are connected to each other via a bidirectional voltage transformer. An important aspect in the context of the present invention is to ensure that all printing material is conveyed out of the printing press because otherwise there will be problems when the press is restarted. For this reason, sufficient electrical energy must be supplied to the main drive that drives the printing material transport to convey out all printing material. For this purpose, the stored kinetic energy of as many auxiliary drives or other energy storage devices in the machine as possible is required. Thus an energy interchange across several different voltage supply levels in the press ought to be possible. In this manner, the kinetic energy stored in the auxiliary drives which are connected to a voltage supply level that is different than that of the main drive motor for printing material transport can be used to supply energy to the main drive motor. The energy interchange between the voltage supply levels is carried out via the bidirectional voltage transformer, which allows the transport of energy in both directions.

Other features which are considered as characteristic for the invention are set forth in the appended claims.

Although the invention is illustrated and described herein as embodied in a printing press without paper during a power failure and a method of operating the printing press, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a block diagram of an electric voltage supply system for a printing press according to the invention.

DETAILED DESCRIPTION OF THE INVENTION

The FIGURE illustrates an electrical voltage supply system of a printing press having a control unit in accordance with the invention.

The FIGURE illustrates a power supply of a printing press 1, which has a number of direct current or DC voltage levels 5, 6, 12. During an ongoing printing operation, the power network of the press 1 generally receives its electrical energy from a three-phase power system L1, L2, L3. In a rectifier 3, the three-phase current is converted into a 540 Volt direct current voltage for a first DC voltage level 5. The 540 Volt DC voltage level 5 supplies the high power electrical drives 9, 10, which has one or more main drive motors 9 with a power of several tens of KW to more than 100 KW, and several auxiliary drive motors 10 with a power in the 10 KW range. A second DC voltage level 6 with a 380 Volt DC voltage is connected to the 540 Volt DC voltage level 5 via a bidirectional DC voltage transformer 7. Due to the bidirectional DC voltage transformer 7 it is possible to interchange electrical energy between the two DC voltage levels 5, 6 in both directions. The 380 Volt DC voltage level 6 primarily supplies electrical energy to auxiliary drives 11 with a power of several KW. These auxiliary drives 11 drive cooling units or blower units of the press 1. A 24 Volt DC voltage level 12 is connected to the 380 Volt DC voltage level 6 via a one-directional DC voltage transformer 8. This low-voltage DC voltage level 12 exclusively supplies electrical energy to small drives 13 and low-voltage consumers 14 such as electronic computers.

In accordance with the invention, a control unit 2 is provided, which monitors the voltage U supplied by the rectifier 3 to detect voltage dips. When the control unit 2 detects a voltage drop below the minimum acceptable operating voltage $U_{min}$, there is a voltage dip in the three-phase power system L1, L2, L3 which disrupts the operation of the printing press. The control unit 2 then decides on the steps to be taken to react to the voltage dip in a suitable way.

The control unit does not merely detect the actual supply voltage U, but also the duration of a voltage dip or power outage. Only when the duration is too long is the press 1 switched to an operating mode in which the printing material that remains in the press 1 is conveyed out of the press 1. If the voltage dip is only of short duration, the control unit 2 only reduces the printing speed of the press 1 without interrupting the printing operation. However, when the voltage dip is too severe and the duration of the voltage dip suggests a power outage, the control unit 2 switches the accessory drives 10 and the auxiliary drives 11 to the generator mode. As a result, all kinetic energy coming from the accessory drives 10 and the auxiliary drives 11 is supplied to the main drive motor 9 via the DC voltage levels 5, 6, which are connected by means of the bidirectional DC voltage transformer 7. If necessary, the control unit 2 may additionally switch off the small drives 13 of the 24 Volt DC voltage level 12 to further reduce power consumption. In this case, only the low-voltage consumers 14 such as control computer and control unit 2 remain as consumers in the DC voltage levels 5, 6, 12 in addition to the main drive 9.

If the control unit 2 detects a power outage that necessitates a shut-down of the press 1, the first step of the control unit 2, which may, for instance, be integrated into the control computer of the printing press 1, is to switch off the printing material supply for example in the feeder of a sheet-fed printing press. This step prevents further printing material from entering the press 1. The printing material remaining in the press 1 continues to be conveyed through the press and to be printed on by the main drive 9. Once the last printing material has left the press 1, the control unit 2 decelerates the main drive 9 via the braking resistor 4. When the main drive 9 has been stopped in this manner, the control unit 2 additionally actuates a retaining brake 15 which mechanically locks the main drive against accidental rotation. This locking is done for safety reasons. If a dangerous situation was to arise at the press 1 due to operator intervention during the printing operation or while the printing material is being conveyed out of the press 1 during a power outage, an immediate emergency stop may be achieved at any time by pushing the emergency stop switch 16. In this case, the conveying out of the printing material is interrupted and the control unit 2 immediately decelerates the main drive 9 to a complete standstill via the braking resistor 4 and, if necessary, by the retaining brake 15. Such an emergency stop is likewise initiated when the operating staff opens a guard on the press 1 while the printing material is conveyed out of the press or while the regular printing operation continues. In such a case, the printing material that stayed in the press must be removed manually before the printing operation can be restarted.

Apart from these emergency stops, the present invention prevents printing material from remaining in the press 1 in the case of a power outage and thus the restart of the press 1 from being unnecessarily delayed. Moreover, productivity of the press 1 is increased as waste is avoided because the printing operation is maintained while the printing material that remained in the printing press 1 is being conveyed out of the press 1.

The invention claimed is:

1. An electrical voltage supply device for a machine processing printing material, the machine having at least one drive motor for transporting the printing material and further electrical consumers, the electrical voltage supply device comprising:

a control unit which, when a supply voltage drops below a minimum acceptable supply voltage of the machine processing the printing material, switches off the further electrical consumers which are not required for the transport of the printing material and supplies the drive motor for the transport of the printing material from energy stored in moving masses of the machine processing the printing material;

said control unit stopping a supply of the printing material to the machine processing the printing material when the supply voltage drops below the minimum acceptable supply voltage and conveying the printing material remaining in the machine processing the printing material through the machine processing the printing material; and the machine processing the printing material is a sheet-fed rotary printing press and the printing material are sheets.

2. The electrical voltage supply device according to claim 1, wherein the printing material still present in the sheet-fed rotary printing press processing the printing material is conveyed out by the energy stored in the moving masses of the sheet-fed rotary printing press processing the printing material.

3. The electrical voltage supply device according to claim 2, wherein said control unit stops the sheet-fed rotary printing press once the printing material present in the sheet-fed rotary printing press has been conveyed out.

4. The electrical voltage supply device according to claim 1, wherein said control device records a duration of a voltage dip and continues the processing of the printing material in the sheet-fed rotary printing press if the duration is short.

5. The electrical voltage supply device according to claim 2, wherein, after the printing material has been conveyed out of the sheet-fed rotary printing press processing the printing material, a stopping of the sheet-fed rotary printing press is achieved by switching on a braking device.

6. The electrical voltage supply device according to claim 2, wherein the sheet-fed rotary printing press processing the printing material includes a retaining brake for the drive motor driving the transport of the printing material, the retaining brake being actuated by said control unit after the conveying out of the printing material has been completed and the sheet-fed rotary printing press has been stopped.

7. The electrical voltage supply device according to claim 1, wherein the sheet-fed rotary printing press processing the printing material includes an operating element for an emergency stop and wherein, upon actuation of the operating element, said control unit causes an immediate stopping of the sheet-fed rotary printing press by activating at least one of a braking device and a braking resistor.

8. The electrical voltage supply device according to claim 1, wherein while the printing material is being conveyed out, said control unit maintains settings in the sheet-fed rotary printing press which are required for a printing operation.

9. The electrical voltage supply device according to claim 1, further comprising a bidirectional voltage transformer, the electrical voltage supply device is provided with at least two different voltage supply levels and at least two of the different voltage supply levels are connected to each other by said bidirectional voltage transformer.

10. A sheet-fed rotary printing press, comprising:

at least one drive motor for transporting printing material being sheets;

electrical consumers; and an electrical voltage supply having a control unit which, when a supply voltage drops below a minimum acceptable supply voltage of the printing press processing the printing material, switches off said further electrical consumers which are not required for transporting the printing material and supplies said drive motor for transporting the printing material from energy stored in moving masses of the sheet-fed rotary printing press processing the printing material, said control unit stopping a supply of the printing material to the sheet-fed rotary printing press when the supply voltage drops below the minimum acceptable supply voltage and conveying the printing material remaining in the printing press through the printing press.

11. A method of operating a sheet-fed rotary printing press processing printing material, the sheet-fed rotary printing press having at least one drive motor for transporting the printing material, a control unit and further electrical consumers, which comprises the steps of:

programming the control unit such that, when a supply voltage drops below a minimum acceptable supply voltage of the sheet-fed rotary printing press, the control unit switches off the further electrical consumers which are not required for transporting the printing material and supplies the drive motor for transporting the printing material with energy stored in moving masses of the sheet-fed rotary printing press; and stopping, via the control unit, a supply of the printing material to the sheet-fed rotary printing press when the supply voltage drops below the minimum acceptable supply voltage and conveying the printing material remaining in the sheet-fed rotary printing press through the sheet-fed rotary printing press.

12. The method according to claim 11, which further comprises conveying out the printing material still present in the sheet-fed rotary printing press processing the printing material by the energy stored in the moving masses of the sheet-fed rotary printing press.

13. The method according to claim 12, which further comprises stopping, via the control unit, the sheet-fed rotary printing press once the printing material present in the sheet-fed rotary printing press has been conveyed out.

14. The method according to claim 11, which further comprises recording, via the control device, a duration of a voltage dip and allowing continued operation of the processing of the printing material in the sheet-fed rotary printing press if the duration is less than 1 minute.

15. The method according to according to claim 12, which further comprises stopping the sheet-fed rotary printing press by switching on a braking device after the printing material has been conveyed out of the sheet-fed rotary printing press processing the printing material.

16. The method according to claim 12, which further comprises actuating a retaining brake of the drive motor after a conveying out of the printing material has been completed and the sheet-fed rotary printing press has been stopped.

17. The method according to claim 11, wherein the sheet-fed rotary printing press includes an operating element for an emergency stop and wherein, upon actuation of the operating element, the control unit causes an immediate stopping of the sheet-fed rotary printing press by activating at least one of a braking device and a braking resistor.

18. The method according to claim 11, wherein while the printing material is being conveyed out, the control unit maintains settings in the sheet-fed rotary printing press which are required for a printing operation.

19. The method according to claim 11, which further comprises:

providing the sheet-fed rotary printing press with a bidirectional voltage transformer; and providing the electrical voltage supply device with at least two different voltage supply levels and at least two of the different voltage supply levels are connected to each other by the bidirectional voltage transformer.

* * * * *